US011320896B2

(12) United States Patent
Yu et al.

(10) Patent No.: US 11,320,896 B2
(45) Date of Patent: May 3, 2022

(54) SYSTEMS AND METHODS FOR OBJECT TRACKING USING FUSED DATA

(71) Applicant: Facebook Technologies, LLC, Menlo Park, CA (US)

(72) Inventors: Tsz Ho Yu, San Jose, CA (US);
Chengyuan Yan, Fremont, CA (US);
Christian Forster, Baar (CH)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 16/983,958

(22) Filed: Aug. 3, 2020

(65) Prior Publication Data
US 2022/0035441 A1     Feb. 3, 2022

(51) Int. Cl.
*G06F 3/01*     (2006.01)
*G06K 9/00*     (2006.01)
*G06K 9/62*     (2006.01)

(52) U.S. Cl.
CPC .......... *G06F 3/011* (2013.01); *G06K 9/00355* (2013.01); *G06K 9/00664* (2013.01); *G06K 9/6289* (2013.01)

(58) Field of Classification Search
CPC combination set(s) only.
See application file for complete search history.

(56) References Cited

U.S. PATENT DOCUMENTS

| | | | |
|---|---|---|---|
| 9,613,298 B2 * | 4/2017 | Guzman-Rivera | G06K 9/6282 |
| 10,565,731 B1 * | 2/2020 | Reddy | G06T 7/75 |
| 10,691,233 B2 * | 6/2020 | Dalton | A63F 13/24 |
| 10,740,924 B2 * | 8/2020 | Balan | G06F 3/0346 |
| 10,792,561 B2 * | 10/2020 | Nishimaki | G06F 3/01 |
| 10,987,573 B2 * | 4/2021 | Nietfeld | G06F 3/0325 |
| 2017/0357332 A1 | 12/2017 | Balan et al. | |
| 2018/0067545 A1 * | 3/2018 | Provancher | A63F 13/218 |
| 2018/0101247 A1 * | 4/2018 | Lee | G06F 3/03547 |
| 2019/0033988 A1 * | 1/2019 | Hesch | G06T 7/74 |
| 2019/0102927 A1 * | 4/2019 | Yokokawa | G06F 3/012 |
| 2019/0113966 A1 * | 4/2019 | Connellan | G06F 3/0346 |

(Continued)

FOREIGN PATENT DOCUMENTS

WO     2007130791 A2     11/2007

OTHER PUBLICATIONS

International Search Report and Written Opinion for International ApplicationNo. PCT/US2021/043345, dated Nov. 15, 2021, 10 pages.

*Primary Examiner* — Motilewa Good-Johnson
(74) *Attorney, Agent, or Firm* — Baker Botts L.L.P.

(57) ABSTRACT

In one embodiment, a method includes capturing, using one or more cameras implemented in a wearable device worn by a user, a first image depicting at least a part of a hand of the user holding a controller in an environment, identifying one or more features from the first image to estimate a pose of the hand of the user, estimating a first pose of the controller based on the pose of the hand of the user and an estimated grip that defines a relative pose between the hand of the user and the controller, receiving IMU data of the controller, and estimating a second pose of the controller by updating the first pose of the controller using the IMU data of the controller. The method utilizes multiple data sources to track the controller under various conditions of the environment to provide an accurate controller tracking consistently.

20 Claims, 7 Drawing Sheets

(56) References Cited

U.S. PATENT DOCUMENTS

| | | | |
|---|---|---|---|
| 2020/0033937 A1* | 1/2020 | Erivantcev | G06F 3/012 |
| 2020/0326544 A1* | 10/2020 | Wan | G06K 9/00362 |
| 2020/0334461 A1* | 10/2020 | Rabinovich | G06F 3/0346 |
| 2020/0364901 A1* | 11/2020 | Choudhuri | G02B 27/0179 |
| 2020/0372702 A1* | 11/2020 | Yan | G06F 3/0346 |

* cited by examiner

SYSTEMS AND METHODS FOR OBJECT TRACKING USING FUSED DATA

TECHNICAL FIELD

This disclosure generally relates to an object tracking, and more specifically methods, apparatus, and system for an object tracking based on a fusion of feature estimation and sensor data.

BACKGROUND

Input instructions provided to AR/VR devices is typically based on controller tracking or hand tracking. A controller can be tracked using the known patterns formed by infrared (IR) light emitting diodes (LEDs) on the controller and input an instruction in a specific location in an environment via the button on the controller. An input instruction can also be made by a hand gesture by tracking features of the hand. For example, a user can turn a page of a virtual book by tracking a swipe gesture of the hand. However, controller tracking is more costly because of the additional hardware required, e.g., IR cameras and IR LED lights on the controller which could sometimes be interfered by occlusions or other light sources, and hand tracking is less accurate.

SUMMARY OF PARTICULAR EMBODIMENTS

To address the foregoing problems, disclosed are methods, apparatuses, and a system, to track a controller by estimating a grip of a hand and adjusting the grip of the hand based on inertial measurement unit (IMU) data from the controller. The present disclosure provides a method to track a controller without implementing LEDs in the controller (e.g., without tracking a pattern of LED lights), so that the method disclosed in the present application provides a cost-efficient, accurate way to track the controller. The method disclosed in the present application may estimate a grip of a user's hand based on feature-tracking identified from captured images of the user's hand and then estimate a pose of the controller using the estimated grip of the user's hand. Furthermore, the method of the present application may receive IMU data of the controller to adjust the estimated pose of the controller and provide a final pose of the controller at a faster frequency.

The embodiments disclosed herein are only examples, and the scope of this disclosure is not limited to them. Particular embodiments may include all, some, or none of the components, elements, features, functions, operations, or steps of the embodiments disclosed herein. According to one embodiment of a method, the method comprises, by a computing system, capturing, using one or more cameras implemented in a wearable device worn by a user, a first image depicting at least a part of a hand of the user holding a controller in an environment. The method further comprises identifying one or more features from the first image to estimate a pose of the hand of the user. The method yet further comprises estimating a first pose of the controller based on the pose of the hand of the user and an estimated grip that defines a relative pose between the hand of the user and the controller. The method further comprises receiving IMU data of the controller. The method further comprises estimating a second pose of the controller by updating the first pose of the controller using the IMU data of the controller.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Certain aspects of the present disclosure and their embodiments may provide solutions to these or other challenges. There are, proposed herein, various embodiments which address one or more of the issues disclosed herein. The methods disclosed in the present disclosure may provide a tracking method for a controller, which estimates and adjusts the pose of the controller based on the estimation of the grip and the IMU data of the controller. Furthermore, based on the pose of the controller relative to the environment and the user's hand, the method disclosed in the present application may also provide an IMU-predicted pose of the user's hand to reduce a search range of the user's hand in a next frame. Therefore, particular embodiments disclosed in the present application may track the controller cost-efficiently (e.g., no needs to install LEDs) and improve the process time to perform tracking tasks.

Particular embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The accompanying drawing figures incorporated in and forming a part of this specification illustrate several aspects of the disclosure, and together with the description serve to explain the principles of the disclosure.

DESCRIPTION OF EXAMPLE EMBODIMENTS

Current AR/VR devices are commonly paired with a portable/wearable device (e.g., a controller) to provide the user an easy, intuitive way to input instructions for the AR/VR devices. The controller is usually equipped with at least one inertial measurement unit (IMU) and infrared (IR) light emitting diodes (LEDs) for the AR/VR devices to estimate a pose of the controller and/or to track a location of the controller, such that the user may perform certain functions via the controller. For example, the user may use the controller to display a visual object in a corner of the room. However, equipping LEDs increases the cost of manufacturing the controller, and tracking the controller via determining a pattern of LED lights could be interfered under certain environment conditions. Also, purely relying on feature-tracking to track a controller could be inaccurate. Particular embodiments disclosed in the present disclosure provide a method to estimate a pose of the controller by fusing feature-tracking data of the user's hand and IMU data of the controller.

Furthermore, particular embodiments disclosed in the present disclosure may provide an IMU-predicted pose of the user's hand based on the fusion of the estimated grip of the hand and the IMU data of the controller to facilitate hand-tracking in a next frame. Utilizing the IMU data of the controller to adjust the grip of the hand can update the pose of the controller more frequently to keep an efficient, accurate tracking. Particular embodiments disclosed in the present disclosure may be applied to any kind of tracking system, such as visual inertial odometry (VIO)-based simultaneous localization and mapping (SLAM) tracking system, with efficiency and less cost.

Figure 1A:
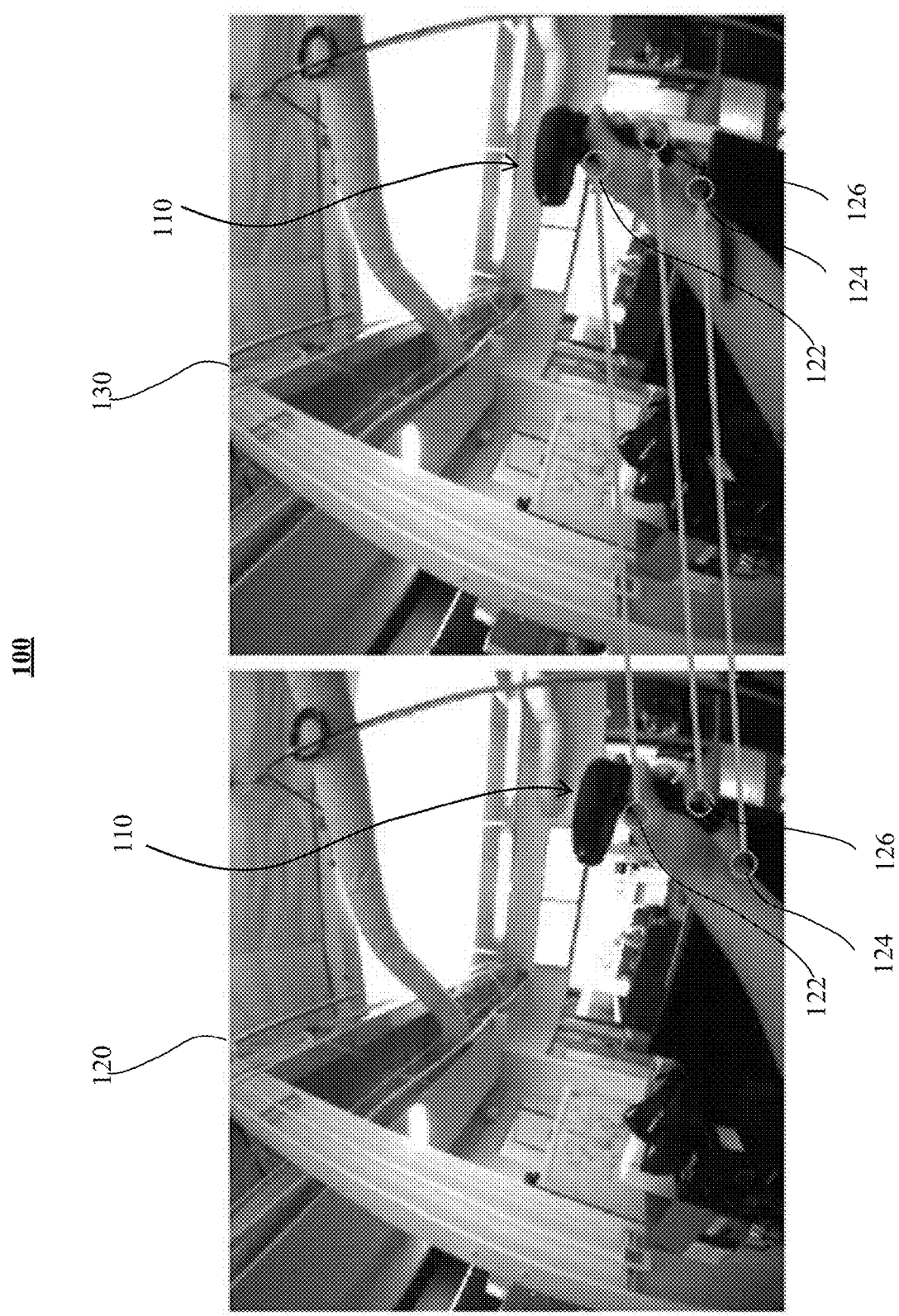
FIGS. 1A-1B illustrate an example diagram of a tracking system for a controller.
Figure 1B:
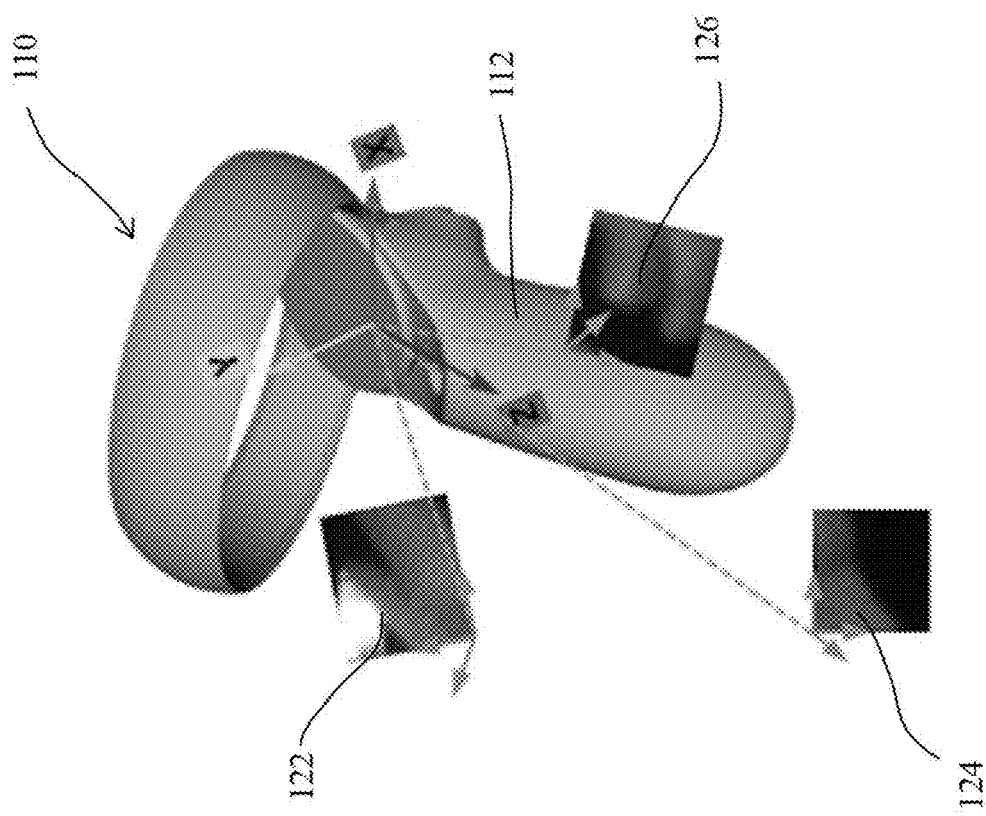

FIGS. 1A-1B illustrate an example tracking system for tracking a controller, in accordance with certain embodiments. In FIG. 1A, the tracking system 100 comprises a central module (not shown) and a controller module 110 (e.g., a controller). The central module comprises a camera and at least one processor to track the controller module 110 in an environment. In particular embodiments, the central module may be implemented in a wearable device, such as a head-mounted device, to capture an image of an object to be tracked (e.g., a controller implemented with the controller module 110). For example, the wearable device with the camera may perform an inside-out tracking (e.g., SLAM) for an object. In particular embodiments, the object to be tracked may also be tracked by one or more cameras implemented/fixed in the environment, e.g., an outside-in tracking.

The camera of the central module may capture a first frame 120 depicting at least part of a user's hand. More specifically, the first frame 120 depicts at least a part of the user's hand holding the controller module 110. The central module may identify one or more features 122, 124, 126 of at least part of a user's hand from the first frame 120. In particular embodiments, the first frame 120 may comprise one or more feature at least depicting the user's hand holding the controller module 110. In FIG. 1B, the controller module 110 comprises a handle 112 for a user to hold. The central module identifies the features 122, 124, 126 of a user's hand which may be used to estimate a pose of the user's hand. For example, an area 122 where the purlicue of the hand overlaps with the controller 110, the ulnar border of the hand 124 where represents a user's hand holding the controller 110, and an area 126 including the finger tips and the controller 110. The identified features 122,124,126 from the first frame 120 may be used to estimate a pose/location of the user's hand. Furthermore, the pose of the user's hand may be used to estimate a grip of the user's hand. For example, the pose of the user's hand may be a skeleton/a primary geometry of the user's hand representing a hand gesture of the user. The estimated grip of the user's hand may be utilized to estimate a pose of a controller module 110 based on the estimated grip of the user's hand which defines a relative pose between the hand of the user and the controller module 110.

The controller module 110 comprises at least one IMU, such that the controller module 110 may provide IMU data to the central module to update/adjust the estimated pose of the controller module 110. The controller module 110 may provide the IMU data at a frequency which is faster than a frequency of the central module taking a frame of the user and the controller module 110. For example, the central module may capture a second frame 130 of the user holding the controller module 110 and identify the features 122, 124, 126 or any other potential features which can be used to estimate the pose of the user's hand from the second frame 130. Before the central module estimates an updated pose of the user's hand based on the identified features in the second frame 130, the central module may use the received IMU data of the controller module 110 to adjust the estimated pose of the controller module 110 which was estimated based on the grip of the hand estimated from the first frame 120. In particular embodiments, the central module may provide/update a pose of the user's hand at a frequency of 30 Hz (e.g., based on captured frames) for estimating a pose of the controller module 110, and the controller module 110 may provide the IMU data at a frequency of 500 Hz to the central module for updating the estimated pose of the controller module 110, such that the pose of the controller module 110 can be tracked/adjusted at a faster frequency based on the IMU data of the controller module 110 to keep the accuracy and efficiency of tracking the controller module 110. In particular embodiments, the central module may output the pose of the controller based on either tracking result (e.g., feature tracking or IMU tracking) as needed.

In particular embodiments, the captured frames may be a visible-light image which is identified to comprise at least one feature which can be used to estimate a pose of the user's hand. The visible-light image may be an RGB image, a CMYK image, a greyscale image, or any suitable image for estimating a pose of the user's hand. In particular embodiments, the identified features 122, 124, 126 from the captured frames 120, 130 are configured to be accurately tracked by a camera of the central module to determine a motion, orientation, and/or spatial position of the controller module 110 (e.g., correspondence data of the controller module 110) for reproduction in a virtual/augmented environment. In particular embodiments, the estimated pose of the controller module 110 may be adjusted by a spatial movement (X-Y-Z positioning movement) determined based on the identified features 122, 124, 126 between frames (e.g., the first frame 120 and the second frame 130). For example, the central module may determine an updated spatial position of the user's hand in a frame k+1, e.g., a frame captured during operation, and compare it with a previous spatial position of the user's hand in a frame k, e.g., a frame captured previously or stored in a storage, to readjust the pose of the user's hand. Detailed operations and actions performed at the central module for tracking the controller module may be further described in FIGS. 2 to 5.

Figure 2:
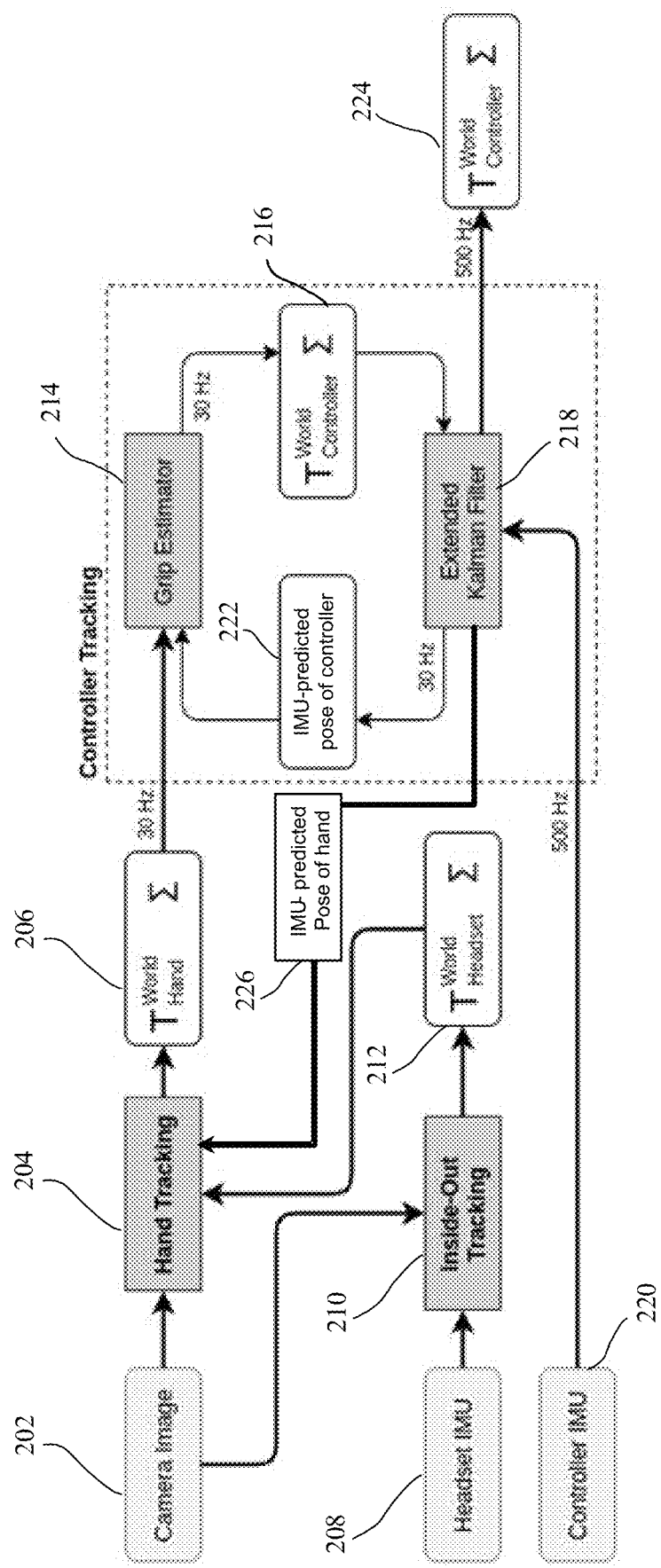
FIG. 2 illustrates an example diagram of a tracking system architecture using fused sensor data.

FIG. 2 illustrates an example tracking system 200 comprising a central module and a controller module, in accordance with certain embodiments. The tracking system 200 comprises a central module implemented in a headset which is worn by a user, and a controller module implemented in a controller which is held by the user. In particular embodiments, the user may have two controllers paired with the headset for each hand. The headset comprises at least one camera, at least one IMU, and at least one processor which is configured to process instructions for tracking a controller. Furthermore, the controller comprises at least one IMU which is configured to provide IMU data of the controller to the central module of the headset, and at least one processer which is configured to process instructions/calibrations sent from the headset.

The camera of the headset captures one or more image of the user and the controller 202 in an environment and identifies one or more features of the user's hand from the image 202 for hand tracking 204 via machine learning or deep learning. Based on the identified features which can be used to estimate/determine a pose of the user's hand, the processor of the headset may estimate a pose of the user's hand and/or a location of the user's hand based on the identified features. In particular embodiments, the pose of the user's hand may be estimated based on repeated feature identified over a series of images. In particular embodiments, the processor of the headset may estimate a pose of the user's hand relative to the environment 206 based on the results of hand tracking 204.

In particular embodiments, the IMU of the headset 208 may also provide IMU data of the headset to the processor of the headset, and the processor of the headset may estimate a pose of the headset relative to the environment 212 via inside-out tracking 210 based on the IMU data of the headset. In particular embodiments, the processor of the headset may estimate a pose of the headset relative to the environment 212 via inside-out tracking 210 based on the IMU data of the headset and the camera image 202. For example, the IMU data of the headset may provide information of angler velocity, acceleration, and motion of the headset to calculate a pose of the headset in the environment. Furthermore, the processor of the headset may utilize the pose of the headset relative to the environment 212 to facilitate the hand tracking 204. For example, the pose of the headset relative to environment 212 may be fed to facilitate the hand tracking 204 by comparing a pose/location of the headset relative to the environment 212 with the image of the user and the controller 202 in the environment to adjust/estimate the pose of the user's hand.

The processor of the headset may then estimate a grip of the user's hand 214 based on the estimated pose of the user's hand 206 and estimate a pose of the controller relative to the environment 216 based on the estimated grip of the user's hand 214. For example, the processor of the headset may use the pose of the user's hand (including the identified features from the user's hand) to estimate the user's hand representing a gesture of holding the controller, such that, based on an inverse of the gesture/pose of the user's hand, the processor of the headset may generate a pose of the controller.

Furthermore, the IMU of the controller provides IMU data of the controller 220 to the headset for data fusion 218 to adjust the pose of the controller estimated based on the grip of the user's hand. The data fusion unit 218 may utilize the IMU data to calculate an IMU-predicted pose of the controller unit 222. The IMU-predicted pose of the controller unit 222 may be utilized by the grip estimator unit 214 to adjust the pose of the controller relative to the environment and estimate an inverse grip of the user's hand 214, where the inverse grip infers the pose of the user's hand 214 based on the pose of the adjusted pose of the controller. In particular embodiments, the final pose of the controller 224 may be provided based on the operations/needs of the headset. For example, the final pose of the controller 224 may be estimated in-between two captured frames (e.g., before the next estimation of the grip). On the other hand, the final pose of the controller 224 may also be estimated based on the IMU-adjusted grip, e.g., the estimated grip adjusted by the received IMU data of the controller. The processor of the headset may estimate the final pose of the controller 224 at a certain frequency based on a request or a demand to save power.

In addition, based on the data provided by the data fusion 218, the processor of the headset may provide an IMU-predicted pose of the hand 226 based on the IMU-predicted pose of the controller 222 and use the IMU-predicted pose of the hand 226 to facilitate the hand tracking 204. For example, the IMU-predicted pose of the controller 222 can be provided at a faster frequency (e.g., 500 Hz to 1 kHz) to fill in the gap between two frames. By applying the inverse grip estimation to the IMU-predicted pose of the controller 222, the headset can generate an IMU-predicted pose of the hand 226. The IMU-predicted pose of the hand 226 can be used to reduce a search range of the hand in the next frame to improve process time of the hand tracking 204.

Figure 3:
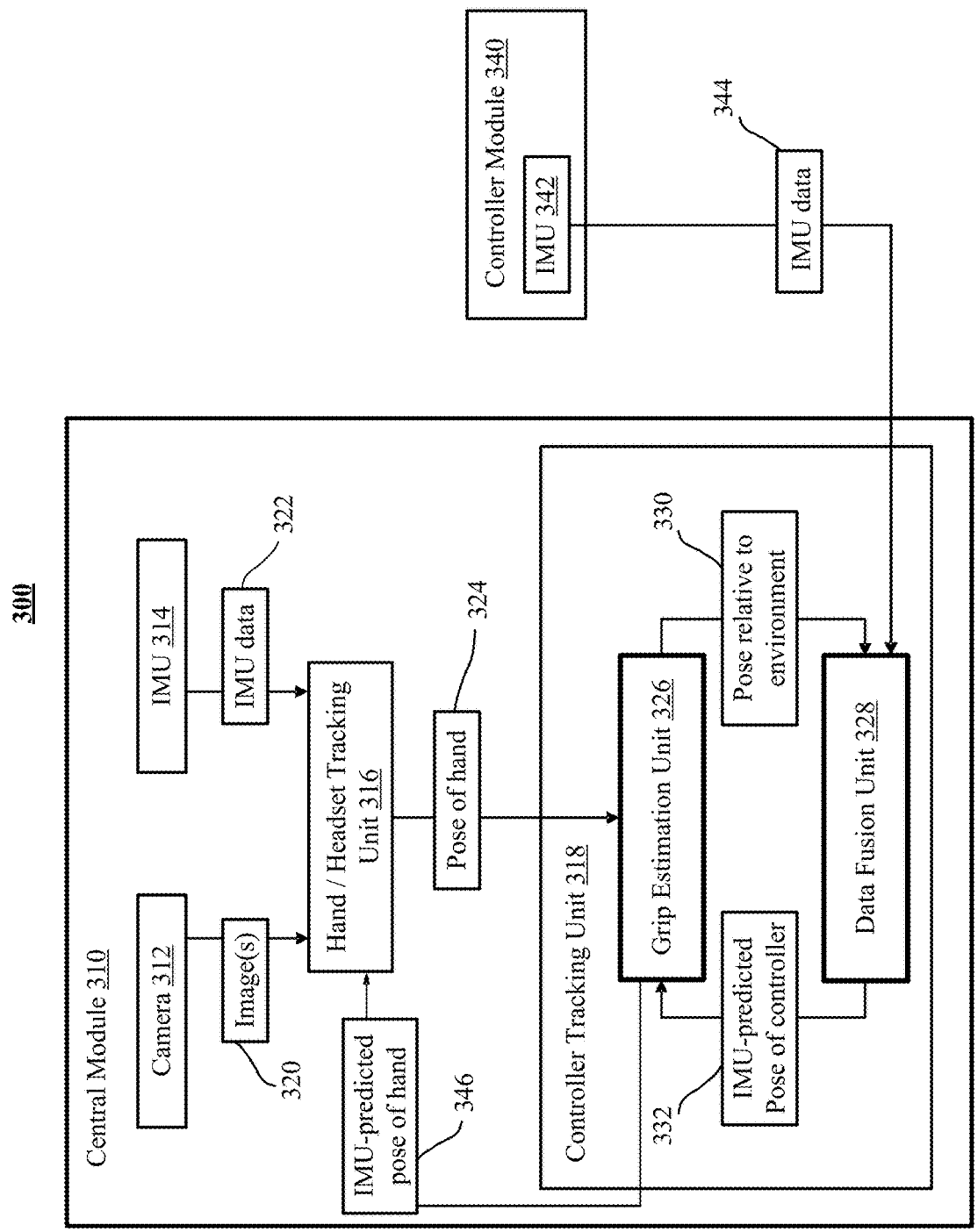
FIG. 3 illustrates an example diagram of a tracking system comprising a central module and a controller module for tracking a controller.

FIG. 3 illustrates an example diagram of a tracking system 300 comprising a central module 310 and a controller module 340, in accordance with certain embodiments. The central module 310 comprises a camera 312, an IMU 314, a hand and headset tracking unit 316, and a controller tracking unit 318 to perform a tracking/adjustment for the controller module 340 in an environment. The central module 310 is paired with the controller module 340 to perform certain functions via the controller module 340. The controller module 340 comprises at least one IMU 342 configured to provide IMU data 344 for the central module 310 to track the controller module 340. In particular embodiments, the controller module 340 sends the IMU data 344 to the controller tracking unit 318 for computing predictions of a corresponding module, e.g., correspondence data of the controller module 340. In particular embodiments, the central module 340 measures the pose of the controller module 340 at a frequency from 500 Hz to 1 kHz based on the IMU data 344 of the controller module 340.

In order to generate/estimate a pose of the controller module 340 during operation, the camera 312 of the central module 310 may capture an image or a series of images 320 when the controller module 340 is within a field of view (FOV) range of the camera for tracking the controller module 340. In particular embodiments, the image 320 depict at least a part of the user's hand holding the controller module 340. The camera 312 of the central module 310 sends the image 320 to the hand/headset tracking unit 316 for an estimation of a pose of the user's hand based on features identified from the images 320.

The hand/headset tracking unit 316 identifies one or more features of the user's hand from the image 320 via machine learning, deep learning, or any suitable computing methods. Based on the identified features which can be used to estimate/determine a pose of the user's hand 324, the hand/headset tracking unit 316 of the central module 310 estimates a pose of the user's hand 324 and/or a location of the user's hand in the environment based on the identified features of the user's hand. In particular embodiments, the pose of the user's hand 324 may be estimated based on repeated feature identified over a series of images. The hand/headset tracking unit 316 of the central module 310 estimates the pose of the user's hand 324 at a frequency based on a processing capability or a requirement. In particular embodiments, the hand/headset tracking unit 316 of the central module 310 estimates the pose of the user's hand 324 at a frequency of 30 Hz.

In particular embodiments, the IMU 314 of the central module 310 also sends IMU data 322 to the hand/headset tracking unit 316 to facilitate the estimation of the pose of the headset. For example, the hand/headset tracking unit 316 may perform an inside-out tracking to estimate a pose of the central module 310. Based on the image 320 (including the controller module 340 in the environment) and the IMU data 322 of the central module 316, the hand/headset tracking unit 316 of the central module 310 may estimate the pose of the central module 310, so that the estimated pose of the user's hand 324 (estimated based the images 320) may be adjusted by the pose of the central module 310 (e.g., the location of the central module 310 relative to the user's hand in the environment).

The hand/headset tracking unit 316 of the central unit 310 sends the pose of the user's hand 324 to the controller tracking unit 318 for controller tracking. The controller tracking unit 318 comprises a grip estimation unit 326 configured to estimate a grip of the user's hand and a data fusion unit 328 configured to fuse/integrate data sent from the grip estimation unit 326 and data sent from the controller module 340.

The grip estimation unit 326 of the controller tracking unit 318 receives the pose of the user's hand 324 from the hand/headset tracking unit 316 and estimates a grip of the user's hand based on the pose of the user's hand 324. Furthermore, the grip estimation unit 326 estimates a pose of the controller module 340 based on the grip of the user's hand. For example, the pose of the user's hand 324 may reveal a gesture of the user holding the controller module 340. Therefore, based on the pose of the user's hand 324, the grip estimation unit 326 may estimate the grip of the user's hand and then estimate the pose of the controller module relative to the environment 330 based on the grip of the user's hand that defines a relative pose between the user's hand and the controller module 340. Furthermore, the grip estimation unit 326 sends the pose of the controller relative to the environment 330 to the data fusion unit 328.

The data fusion unit 328 of the controller tracking unit 318 receives the pose of the controller relative to the environment 330 from the grip estimation unit 326 of the controller tracking module 318 in the central module 310, and further receives the IMU data 344 from the controller module 340. The data fusion unit 328 may integrate the pose of the controller module relative to the environment 330 with the IMU data 344 of the controller module 340 to output an adjusted/final pose of the controller module for the central module 310 to perform a corresponding instruction accurately via the controller module 340. In particular embodiments, the data fusion unit 328 may output the adjusted pose of controller module at a frequency based on the request or the processing speed of the central module 310. In particular embodiments, the data fusion unit 328 may output the adjusted pose of the controller module at a frequency which is faster than the frequency of estimating the pose of the user's hand, such as 30 Hz, since the data fusion unit 328 can update the pose of the controller module 330 sent from the grip estimation unit 326 when it receives the IMU data 344 from the controller module 340.

Furthermore, the data fusion unit 328 may also provide an IMU-predicted pose of the controller unit 332 based on the IMU data 344 of the controller module 340 to the grip estimation unit 326, such that the grip estimation unit 326 may adjust the pose of the controller module 340 estimated based on the captured frames. The grip estimation unit 326 may provide an IMU-predicted pose of the user's hand 346 based on the IMU data 344 of the controller module 340 to the hand tracking unit 316 to facilitate the process of hand tracking. With the IMU-predicted pose of the user's hand 346, the hand tracking unit 316 may identify features of the user's hand within a predicted range in a next captured frame, so that the hand tracking unit 316 may complete the hand tracking with less process time.

Furthermore, the central module 310 may also utilize these captured images 320 including identified features to conduct extensive services and functions, such as generating a state of the user/the controller module 340, locating the user/the controller module 340 locally or globally, and/or rendering a virtual tag/object in the environment via the controller module 340. In particular embodiments, the central module 310 may also use the IMU data 322 in assistance of generating the state of the user. In particular embodiments, the central module 310 may use the state information of the user relative to the controller module 340 in the environment based on the captured images 320, to project a virtual object in the environment or set a virtual tag in a map via the controller module 340.

In particular embodiments, the tracking system 300 may be implemented in any suitable computing device, such as, for example, a personal computer, a laptop computer, a cellular telephone, a smartphone, a tablet computer, an augmented/virtual reality device, a head-mounted device, a portable smart device, a wearable smart device, or any suitable device which is compatible with the tracking system 300. In the present disclosure, a user which is being tracked and localized by the tracking device may be referred to a device mounted on a movable object, such as a vehicle, or a device attached to a person. In the present disclosure, a user may be an individual (human user), an entity (e.g., an enterprise, business, or third-party application), or a group (e.g., of individuals or entities) that interacts or communicates with the tracking system 300. In particular embodiments, the central module 310 may be implemented in a head-mounted device, and the controller module 340 may be implemented in a remote controller separated from the head-mounted device. The head-mounted device comprises one or more processors configured to implement the camera 312, the IMU 314, the hand/headset tracking unit 316, and the controller unit 318 of the central module 310. In one embodiment, each of the processors is configured to implement the camera 312, the IMU 314, the hand/headset tracking unit 316, and the controller unit 318 separately. The remote controller comprises one or more processors configured to implement the IMU 342 of the controller module 340. In one embodiment, each of the processors is configured to implement the IMU 342 separately.

This disclosure contemplates any suitable network to connect each element in the tracking system 300 or to connect the tracking system 300 with other systems. As an example and not by way of limitation, one or more portions of network may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network may include one or more networks.

Figure 4:
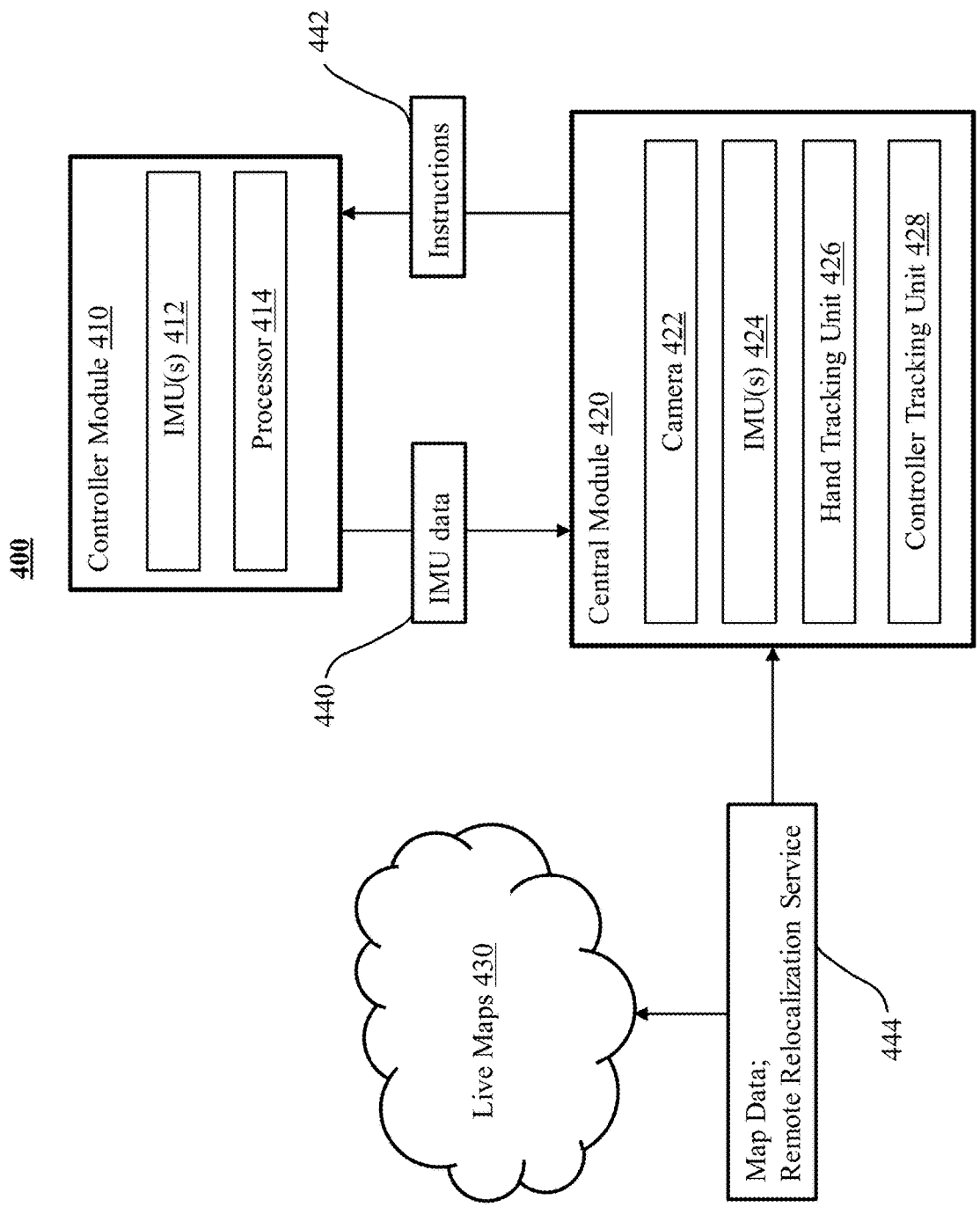
FIG. 4 illustrates an example diagram of a tracking system comprising a central module, a controller module and a remote server for tracking a controller locally or globally.

FIG. 4 illustrates an example diagram of a tracking system 400 with mapping service, in accordance with certain embodiments. The tracking system 400 comprises a controller module 410, a central module 420, and a cloud 430. The controller module 410 comprises at least one IMU 412, and a processor 414. The controller module 410 receives one or more instructions 442 from the central module 420 to perform specific functions. The controller module 410 is configured to send IMU data 440 to the central module 420 for a pose estimation during operation, so that the central module 420 may perform the instructions 442 via the controller module 410 accurately in a map or in the environment.

The central module 420 comprises a camera 422, at least one IMU 424, a hand tracking unit 426, and a controller tracking unit 428. The central module 420 is configured to track the controller module 410 based on various methods, e.g., the method disclosed in FIG. 1A through FIG. 3. The camera 422 of the central module 420 may capture one or more frames of the controller module 410 being held by a user, and the IMU 424 of the central module 420 may provide IMU data of the central module 420 to the hand tracking unit 426. The hand tracking unit 426 may identify features from the captured frames via machine learning to estimate a pose of the user's hand and adjust the pose of the user's hand based on the IMU data of the central module 420. Furthermore, the hand tracking unit 426 sends the pose of the user's hand to the controller tracking unit 428 to estimate a pose of the controller module 410. The controller tracking unit 428 receives the pose of the user's hand and the IMU data 440 of the controller module 410 and estimates the pose of the controller module 410 by fusing the received data.

In particular embodiments, the controller tracking unit 428 may determine correspondence data based on the features identified in different frames. The correspondence data may comprise observations and measurements of the feature, such as a location of the feature of the controller module 410 in the environment. Furthermore, the controller tracking unit 428 may also perform a stereo computation collected near the predetermined feature to provide additional information for the central module 420 to track the controller module 410. In addition, the controller tracking unit 428 of the central module 420 may request a live map from the cloud 430 corresponding to the correspondence data. In particular embodiments, the live map may comprise map data 444. The controller tracking unit 428 of the central module 420 may also request a remote relocalization service 444 for the controller module 410 to be located in the live map locally or globally. In particular embodiments, the pose of the controller module 410 relative to the environment may be built based on the frames captured by the camera 422, e.g., a map built locally. In particular embodiments, the controller tracking unit 428 of the central module 420 may also send the correspondence data of the controller module 410 to the cloud 430 for an update of the map stored in the cloud 430 (e.g., with the environment built locally).

Figure 5:
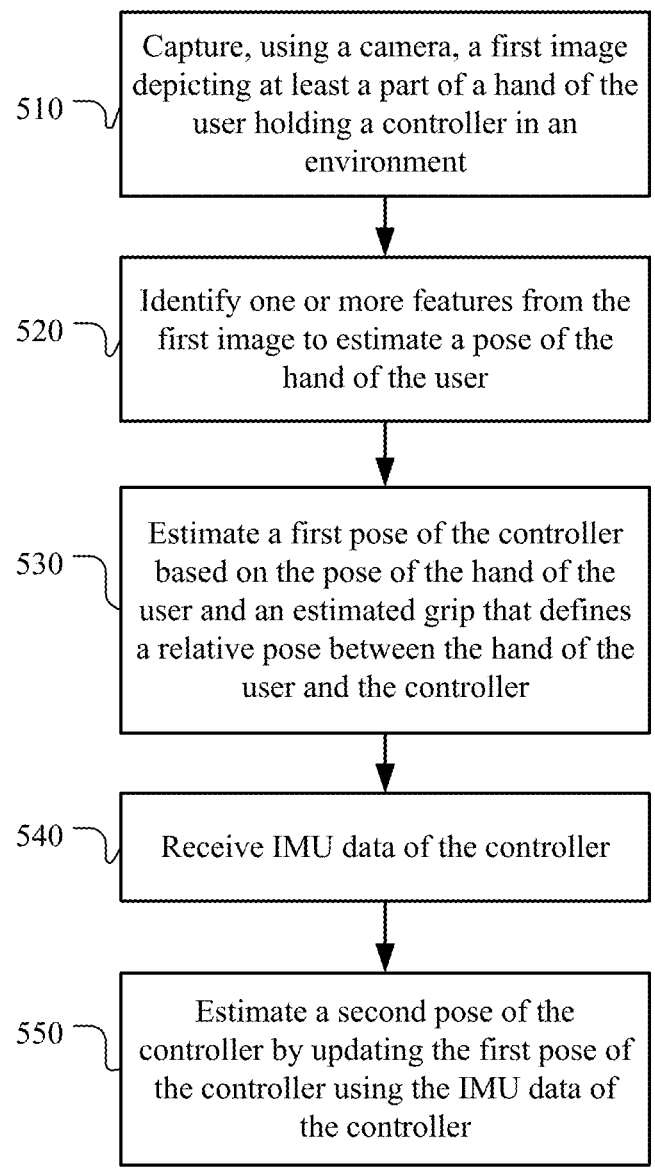
FIG. 5 illustrates an embodiment of a method for tracking adjusting a pose of a controller by fusing feature-tracking of a user's hand and IMU data of a controller.

FIG. 5 illustrates an example method 500 for tracking a controller, in accordance with certain embodiments. A controller module of a tracking system may be implemented in a portable device (e.g., a remote controller with input buttons, a smart puck with touchpad, etc.). A central module of the tracking system may be implemented in a wearable device (e.g., a head-mounted device, etc.), or be provided to or displayed on any computing system (e.g., an end user's device, such as a smartphone, virtual reality system, gaming system, etc.), and be paired with the controller module. The method 500 may begin at step 510 with capturing, using a camera, a first image depicting at least a part of a hand of the user holding a controller in an environment. In particular embodiments, the camera may be one or more cameras implemented in a wearable device worn by a user. In particular embodiments, the wearable device may be a controller. In particular embodiments, the wearable device may be equipped with one or more IMUs.

At step 520, the method 500 may identify one or more features from the first image to estimate a pose of the hand of the user. In particular embodiments, the method 500 may further receive IMU data of the wearable device to estimate a pose of the wearable device and update the pose of the hand of the user based on the pose of the wearable device. Furthermore, the pose of the wearable device is estimated based on the IMU data of the wearable device and the first image of the user.

At step 530, the method 500 may estimate a first pose of the controller based on the pose of the hand of the user and an estimated grip that defines a relative pose between the hand of the user and the controller.

At step 540, the method 500 may receive IMU data of the controller. In particular embodiments, the IMU data of the controller may be received at a faster frequency than a frequency that the first image is captured. For example, the first image may be captured at a first frequency and the IMU data of the controller may be received at a second frequency. The second frequency (e.g., 500 Hz) is higher than the first frequency (e.g., 30 Hz).

At step 550, the method 500 may estimate a second pose of the controller by updating the first pose of the controller using the IMU data of the controller. In particular embodiment, the method 500 may estimate an IMU-predicted pose of the hand based on the updated first pose of the controller and the IMU data of the controller and estimate a second pose of the hand based on the IMU-predicted pose of the hand. In particular embodiments, the method 500 may estimate the second pose of the controller by estimating a pose of the controller relative to the environment based on the estimated grip, adjusting the pose of the controller relative to the environment based on the IMU data of the controller, estimating a pose of the controller relative to the hand based on the adjusted pose of the controller relative to the environment and the IMU of the controller, and estimating the second pose of the controller based on the adjusted pose of the controller relative to the environment and the estimated pose of the controller relative to the hand.

In particular embodiments, the method 500 may further capture, using the camera, a second image of the user depicting at least a part of the hand of the user holding the controller in the environment, identify the one or more features from the second image of the user, and estimate a third pose of the hand based on the one or more features identified from the second image of the user. Furthermore, a frequency of estimating the second pose of the hand (e.g., 500 Hz) is higher than a frequency of estimating the third pose of the hand (e.g., 30 Hz).

In particular embodiments, the wearable device may comprise the camera configured to capture images of the user, a hand-tracking unit configured to estimate the pose of the hand of the user, and a controller-tracking unit configured to estimate the second pose of the controller.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for local localization including the particular steps of the method of FIG. 5, this disclosure contemplates any suitable method for local localization including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
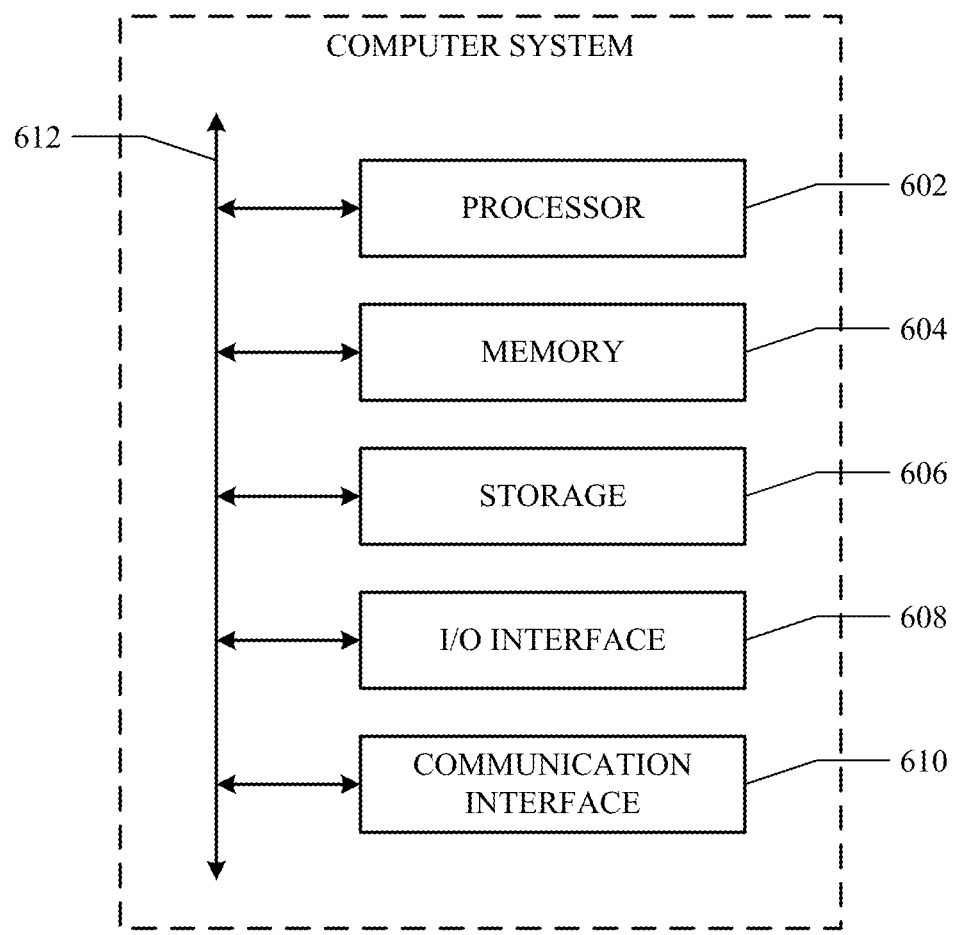
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

According to various embodiments, an advantage of features herein is that the present application can provide a tracking method which does not require a paired controller to equip with LEDs, and yet remains accurate and cost-efficient tracking. The tracking method estimates a pose of the user's hand based on features identified from captured images, and then estimates a grip of the user's hand based on the pose of the user's hand, such that the tracking method can estimate a pose of the controller based on the grip. Furthermore, the tracking method can adjust/calibrate the pose of the controller based on IMU data of the controller. In addition, the processing time of the tracking method can also be improved by the predictions provided by IMU data. Particular embodiments of the present disclosure also enable to track the controller without the LEDs or when the LEDs disposed on the controller fail. Therefore, particular embodiments disclosed in the present disclosure may provide an improved, cost-efficient tracking method for the controller.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method comprising, by a computing system:
   capturing, using one or more cameras implemented in a wearable device worn by a user, a first image depicting at least a part of a hand of the user holding a controller in an environment;
   identifying one or more features from the first image to estimate a pose of the hand of the user;
   estimating a first pose of the controller based on the pose of the hand of the user and an estimated grip that defines a relative pose between the hand of the user and the controller;
   receiving first inertial measurement unit (IMU) data of the controller;
   estimating a second pose of the controller by updating the first pose of the controller using the first IMU data of the controller;
   receiving second IMU data of the controller;
   calculating an IMU-predicted pose of the controller based on the second IMU data;
   estimating an IMU-predicted pose of the hand by applying an inverse of the estimated grip to the IMU-predicted pose of the controller; and
   determining, based on the estimated IMU-predicted pose of the hand, a search range of the hand when capturing a second image depicting at least a part of the hand of the user.

2. The method of claim 1, wherein the first image is captured at a first frequency and the IMU data of the controller is received at a second frequency, wherein the second frequency is higher than the first frequency.

3. The method of claim 1, further comprising:
   receiving IMU data of the wearable device to estimate a pose of the wearable device; and
   updating the pose of the hand of the user based on the pose of the wearable device.

4. The method of claim 3, wherein the pose of the wearable device is estimated based on the IMU data of the wearable device and the first image.

5. The method of claim 1, further comprising:
   estimating a second pose of the hand based on the IMU-predicted pose of the hand.

6. The method of claim 5, further comprising:
   capturing the second image using the one or more cameras, the second image depicting at least a part of the hand of the user holding the controller in the environment;

identifying the one or more features from the second image; and estimating a third pose of the hand based on the one or more features identified from the second image of the user.

7. The method of claim 6, wherein a frequency of estimating the second pose of the hand is higher than a frequency of estimating the third pose of the hand.

8. The method of claim 1, wherein the wearable device comprises:

the one or more cameras configured to capture images;

a hand-tracking unit configured to estimate the pose of the hand of the user; and a controller-tracking unit configured to estimate the second pose of the controller.

9. The method of claim 1, wherein estimating the second pose of the controller comprises:

estimating a pose of the controller relative to the environment based on the estimated grip and the estimated pose of the hand of the user relative to the environment;

adjusting the pose of the controller relative to the environment based on the IMU data of the controller;

estimating a pose of the controller relative to the hand based on the adjusted pose of the controller relative to the environment and the IMU of the controller; and estimating the second pose of the controller based on the adjusted pose of the controller relative to the environment and the estimated pose of the controller relative to the hand.

10. One or more computer-readable non-transitory storage media embodying software that is operable when executed to:

capture, using one or more cameras implemented in a wearable device worn by a user, a first image depicting at least a part of a hand of the user holding a controller in an environment;

identify one or more features from the first image to estimate a pose of the hand of the user;

estimate a first pose of the controller based on the pose of the hand of the user and an estimated grip that defines a relative pose between the hand of the user and the controller;

receive first inertial measurement unit (IMU) data of the controller;

estimate a second pose of the controller by updating the first pose of the controller using the first IMU data of the controller;

receive second IMU data of the controller;

calculate an IMU-predicted pose of the controller based on the second IMU data;

estimate an IMU-predicted pose of the hand by applying an inverse of the estimated grip to the IMU-predicted pose of the controller; and determine, based on the estimated IMU-predicted pose of the hand, a search range of the hand when capturing a second image depicting at least a part of the hand of the user.

11. The media of claim 10, wherein the first image is captured at a first frequency and the IMU data of the controller is received at a second frequency, wherein the second frequency is higher than the first frequency.

12. The media of claim 10, wherein the software is further operable when executed to:

receive IMU data of the wearable device to estimate a pose of the wearable device; and update the pose of the hand of the user based on the pose of the wearable device.

13. The media of claim 12, wherein the pose of the wearable device is estimated based on the IMU data of the wearable device and the first image.

14. The media of claim 10, wherein the software is further operable when executed to:

estimate a second pose of the hand based on the IMU-predicted pose of the hand.

15. The media of claim 14, wherein the software is further operable when executed to:

capture the second image using the one or more cameras, the second image depicting at least a part of the hand of the user holding the controller in the environment;

identify the one or more features from the second image; and estimate a third pose of the hand based on the one or more features identified from the second image of the user.

16. The media of claim 15, wherein a frequency of estimating the second pose of the hand is higher than a frequency of estimating the third pose of the hand.

17. The media of claim 10, wherein the wearable device comprises:

the one or more cameras configured to capture images;

a hand-tracking unit configured to estimate the pose of the hand of the user; and a controller-tracking unit configured to estimate the second pose of the controller.

18. The media of claim 10, wherein estimating the second pose of the controller comprises:

estimating a pose of the controller relative to the environment based on the estimated grip and the estimated pose of the hand of the user relative to the environment;

adjusting the pose of the controller relative to the environment based on the IMU data of the controller;

estimating a pose of the controller relative to the hand based on the adjusted pose of the controller relative to the environment and the IMU of the controller; and estimating the second pose of the controller based on the adjusted pose of the controller relative to the environment and the estimated pose of the controller relative to the hand.

19. A system comprising: one or more processors; and one or more computer-readable non-transitory storage media coupled to one or more of the processors and comprising instructions operable when executed by the one or more of the processors to cause the system to:

capture, using one or more cameras implemented in a wearable device worn by a user, a first image depicting at least a part of a hand of the user holding a controller in an environment;

identify one or more features from the first image to estimate a pose of the hand of the user;

estimate a first pose of the controller based on the pose of the hand of the user and an estimated grip that defines a relative pose between the hand of the user and the controller;

receive first inertial measurement unit (IMU) data of the controller;

estimate a second pose of the controller by updating the first pose of the controller using the first IMU data of the controller;

receive second IMU data of the controller;

calculate an IMU-predicted pose of the controller based on the second IMU data;

estimate an IMU-predicted pose of the hand by applying an inverse of the estimated grip to the IMU-predicted pose of the controller; and determine, based on the estimated IMU-predicted pose of the hand, a search range of the hand when capturing a second image depicting at least a part of the hand of the user.

20. The system of claim 19, wherein the instructions are further operable when executed to:
receive IMU data of the wearable device to estimate a pose of the wearable device; and
update the pose of the hand of the user based on the pose of the wearable device.

* * * * *